(12) United States Patent
Braun et al.

(10) Patent No.: US 9,852,436 B2
(45) Date of Patent: Dec. 26, 2017

(54) DETERMINING RELATIVE INTEREST LEVELS OF TOURISTS AND LOCALS IN POINTS OF INTEREST

(71) Applicant: Google Inc., Mountain View, CA (US)

(72) Inventors: Max Benjamin Braun, San Francisco, CA (US); Matthew Ryan Casey, San Francisco, CA (US)

(73) Assignee: Google Inc., Mountain View, CA (US)

( * ) Notice: Subject to any disclaimer, the term of this patent is extended or adjusted under 35 U.S.C. 154(b) by 784 days.

(21) Appl. No.: 14/051,386

(22) Filed: Oct. 10, 2013

(65) Prior Publication Data

US 2017/0098228 A1    Apr. 6, 2017

Related U.S. Application Data

(60) Provisional application No. 61/712,735, filed on Oct. 11, 2012.

(51) Int. Cl.
| | |
|---|---|
| *G06Q 10/00* | (2012.01) |
| *G06Q 30/00* | (2012.01) |
| *G06Q 30/02* | (2012.01) |
| *G01C 21/36* | (2006.01) |

(52) U.S. Cl.
CPC ..... *G06Q 30/0205* (2013.01); *G01C 21/3679* (2013.01)

(58) Field of Classification Search
USPC .......................................... 705/7.34; 701/426
See application file for complete search history.

(56) References Cited

U.S. PATENT DOCUMENTS

| | | | | |
|---|---|---|---|---|
| 9,374,374 | B2* | 6/2016 | Steinberg | H04L 63/10 |
| 2008/0288355 | A1* | 11/2008 | Rosen | G06F 17/3087 |
| | | | | 705/14.64 |
| 2010/0082436 | A1* | 4/2010 | Maghoul | G06F 17/3087 |
| | | | | 705/14.58 |

(Continued)

OTHER PUBLICATIONS

Ramachandran, et al., "Searching Under the Influence? Explaining Beer Price Dispersion in New York City," Jan. 15, 2010, <http://content.lib.utah.edu/cdm/singleitem/collection/uspace/id/2961>.

(Continued)

*Primary Examiner* — Sujay Koneru
(74) *Attorney, Agent, or Firm* — Dority & Manning, PA (57) ABSTRACT

Systems and methods for determining whether a point-of-interest (POI) corresponds to a tourist location are provided. A method includes receiving a set of assessments for the POI. Each assessment in the set of assessments includes an associated user account. Each assessment in the set of assessments includes a web-based assessment or an in-person assessment of the POI by the associated user account. The method also includes, for plural assessments in the set of assessments, determining whether the associated user account is a tourist user account or a local user account. The method also includes determining a touristiness value for the POI based on a number of in-person assessments including an associated tourist user account, a number of in-person assessments including an associated local user account, a number of web-based assessments including an associated tourist user account, or a number of web-based assessments including an associated local user account.

15 Claims, 5 Drawing Sheets

(56) References Cited

U.S. PATENT DOCUMENTS

| | | | |
|---|---|---|---|
| 2011/0064312 A1* | 3/2011 | Janky | G01C 15/00 382/195 |
| 2011/0151898 A1* | 6/2011 | Chandra | H04W 4/02 455/466 |
| 2011/0202267 A1* | 8/2011 | Amer-Yahia | G01C 21/00 701/532 |
| 2012/0022782 A1* | 1/2012 | Laube | G01C 21/3679 701/410 |
| 2012/0209861 A1* | 8/2012 | Narasimha | G06F 17/30241 707/750 |
| 2012/0316963 A1* | 12/2012 | Moshfeghi | G06Q 20/20 705/14.58 |

OTHER PUBLICATIONS

Fischer, "Locals and Tourists", Flickr, Nov. 30, 2011, retrieved from <http://www.flickr.com/photos/walkingsf/sets/72157624209158632>.

* cited by examiner

DETERMINING RELATIVE INTEREST LEVELS OF TOURISTS AND LOCALS IN POINTS OF INTEREST

CROSS REFERENCE TO RELATED APPLICATION

This application claims priority under 35 U.S. C. §119(e) and the benefit of U.S. Provisional Application No. 61/712,735, filed Oct. 11, 2012, and entitled, "DETERMINING RELATIVE INTEREST LEVELS OF TOURISTS AND LOCALS IN POINTS OF INTEREST," the entire disclosure of which is incorporated herein by reference.

FIELD

The subject technology generally relates to the processing of geographic data and, in particular, relates to determining relative interest levels of tourists and locals in points of interest.

BACKGROUND

Some travelers visiting a geographic region may wish to visit all of the traditional "touristy" points of interest in the geographic region that are frequented by tourists. For example, a traveler in New York City may wish to visit the tourist sites of the Empire State Building and the Statue of Liberty. Alternatively, some travelers may wish to have an "authentic New York City experience," by visiting points of interest that are frequented by locals rather than tourists, for example, "off the beaten path" bars and restaurants. Oftentimes, travelers plan trips and decide which points of interest they will visit by consulting acquaintances who live in the geographic region or via Internet-based mapping and reviewing services.

SUMMARY

The disclosed subject matter relates to a method for determining whether a point of interest corresponds to a tourist location. The method includes receiving a set of assessments for the point of interest. Each assessment in the set of assessments includes an associated user account. Each assessment in the set of assessments includes a web-based assessment or an in-person assessment of the point of interest by the associated user account. The method also includes, for plural assessments in the set of assessments, determining whether the associated user account is a tourist user account or a local user account based on a distance between a default location of the associated user account and the geographic location of the point of interest or based on a number of web-based assessments or in-person assessments of the point of interest by the associated user account. The method also includes determining a touristiness value for the point of interest based on one or more of: a number of in-person assessments including an associated tourist user account, a number of in-person assessments including an associated local user account, a number of web-based assessments including an associated tourist user account, or a number of web-based assessments including an associated local user account. The method also includes providing an indication of the touristiness value.

The disclosed subject matter further relates to a non-transitory computer-readable medium. The computer-readable medium includes instructions that, when executed by a computer, cause the computer to implement a method for determining whether a point of interest corresponds to a tourist location. The instructions include code for receiving a set of assessments for the point of interest. Each assessment in the set of assessments includes an associated user account. Each assessment in the set of assessments includes a web-based assessment or an in-person assessment of the point of interest by the associated user account. The instructions also include code for, for plural assessments in the set of assessments, determining whether the associated user account is a tourist user account or a local user account based on a distance between a default location of the associated user account and the geographic location of the point of interest or based on a number of web-based assessments or in-person assessments of the point of interest by the associated user account. The instructions also include code for determining a touristiness value for the point of interest based on one or more of: a number of in-person assessments including an associated tourist user account, a number of in-person assessments including an associated local user account, a number of web-based assessments including an associated tourist user account, or a number of web-based assessments including an associated local user account. The instructions also include code for, if the touristiness value falls within a tourist value range, providing an indication that the point of interest is a tourist location. The instructions also include code for, if the touristiness value falls within a local value range, providing an indication that the point of interest is a local location.

The disclosed subject matter further relates to a system. The system includes one or more processors. The system also includes a memory. The memory includes instructions that, when executed by the one or more processors, cause the one or more processors to implement a method for determining whether a point of interest corresponds to a tourist location. The instructions include code for receiving a set of in-person assessments for the point of interest. Each in-person assessment in the set of in-person assessments includes an associated user account. The instructions also include code for, for plural in-person assessments in the set of in-person assessments, determining whether the associated user account is a tourist user account or a local user account based on a distance between a default location of the associated user account and the geographic location of the point of interest or based on a number of in-person assessments of the point of interest by the associated user account. The instructions also include code for determining a touristiness value for the point of interest based on a number of in-person assessments including an associated tourist user account or a number of in-person assessments including an associated local user account.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several aspects of the disclosed subject matter are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

When selecting point of interest to visit, travelers may consult with local acquaintances to select local points of interest to visit or use Internet-based mapping and reviewing services to select tourist or local points of interest to visit. One drawback of the consultations with local acquaintances is that the local acquaintances may know of only a few points of interest that locals frequent and may have limited familiarity with the points of interest that tourists frequent. One drawback of the Internet-based mapping and reviewing services is that these services typically do not indicate the relative interest levels of tourists and locals in points of interest. As the foregoing illustrates, an approach to determining and presenting relative interest levels of tourists and locals in points of interest may be desirable.

The subject technology is related to approaches for determining whether a point of interest corresponds to a tourist location. A server machine may receive a set of assessments for the point of interest. Each assessment in the set of assessments includes an associated user account, for example, of a user who made the assessment. Each assessment in the set of assessments includes a web-based assessment or an in-person assessment of the point of interest by the associated user account. A web-based assessment may be conducted by an user via the Internet without visiting the geographic location corresponding to the point of interest. For example, the user may visit a web page associated with the point of interest. An in-person assessment of a point of interest may involve an user visiting the geographic location associated with the point of interest. For example, an in-person assessment of a point of interest may involve a geographic check-in at the point of interest via a social networking service.

The server machine may also, for plural assessments in the set of assessments, determine whether the associated user account is a tourist user account or a local user account based on a distance between a default location, e.g., a home address, of the associated user account and the geographic location of the point of interest or based on a number of web-based assessments or in-person assessments of the point of interest by the associated user account. For example, if the distance between the home address and the geographic location of the point of interest exceeds 100 miles, the associated user account may be considered a tourist user account. If the distance between the home address and the geographic location of the point of interest is less than 50 miles, the associated user account may be considered a local user account. Alternatively, if an associated user account enters more than ten geographic check-ins at the point of interest in one year, the associated user account may be considered a local user account. If an associated user account enters fewer than three geographic check-ins at the point of interest in one year, the associated user account may be considered a tourist user account.

The server machine may also determine a touristiness value for the point of interest based on one or more of: a number of in-person assessments including an associated tourist user account, a number of in-person assessments including an associated local user account, a number of web-based assessments including an associated tourist user account, or a number of web-based assessments including an associated local user account. For example, the touristiness value may correspond to a proportion of the assessments in the set of assessments that are associated with a tourist user account. The server machine may also provide an indication of the touristiness value. For example, the server machine may provide an indication whether the point of interest is a largely tourist location or a largely local location.

Figure 1:
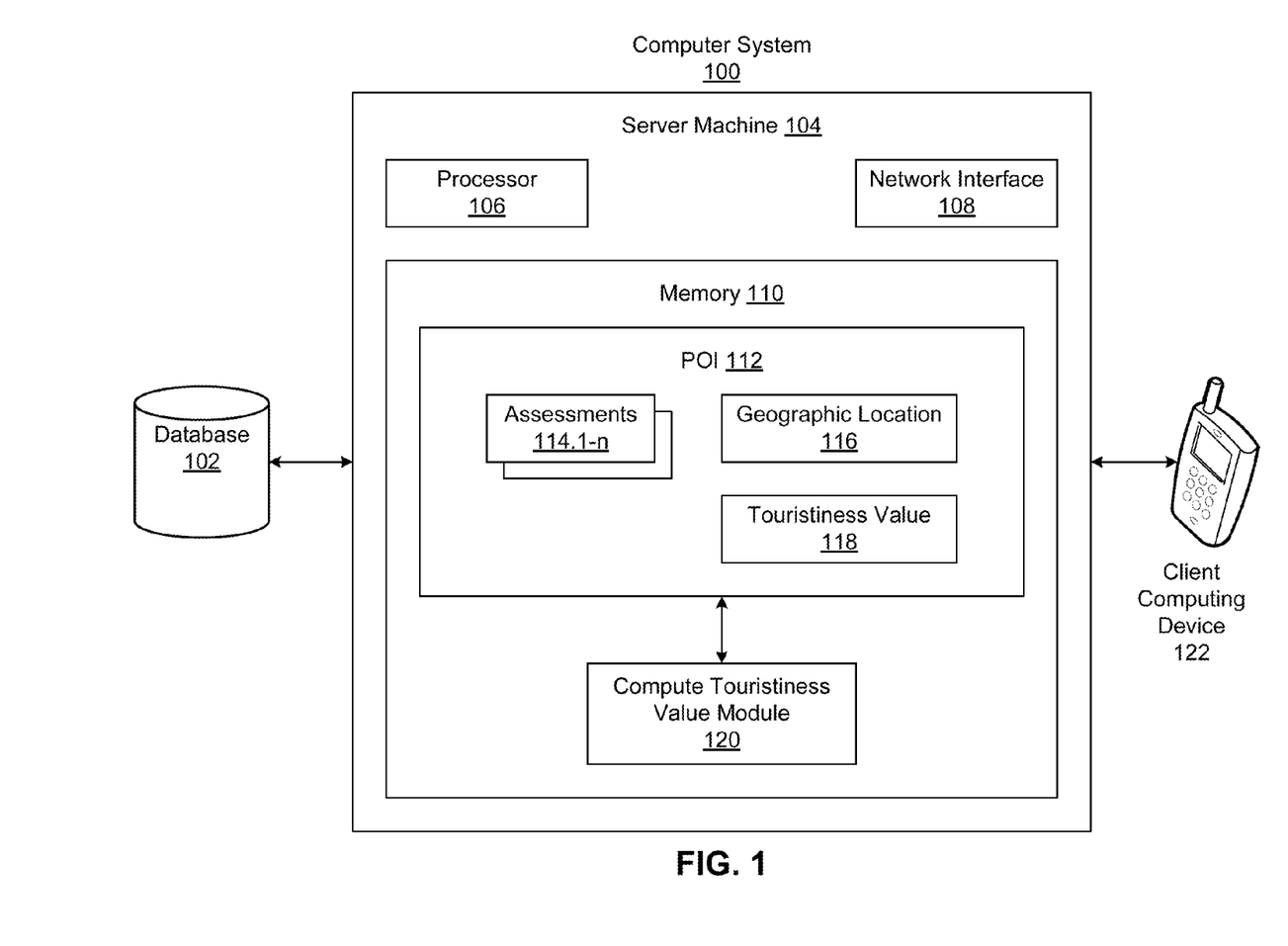
FIG. 1 illustrates an example of a computer system configured to implement determining relative interest levels of tourists and locals in points of interest.

FIG. 1 illustrates an example of a computer system configured to implement determining relative interest levels of tourists and locals in points of interest.

As shown, the computer system 100 includes a database 102, server machine 104, and a client computing device 122. The database, server machine 104, and client computing device 122 may be configured to communicate with one another via a network. The network may be the Internet, an intranet, a cellular network, a local area network (LAN), a wide area network (WAN) or any other network that may be configured to allow multiple devices to communicate with one another.

While only one database 102, server machine 104, and client computing device 122 are illustrated, persons skilled in the art will understand that the techniques disclosed herein may be implemented with one or more databases 102, server machines 104, and client computing devices 122. Furthermore, while the subject technology may be implemented in a network-based computer system 100, persons skilled in the art will understand that a single computing device may perform the functions of two or more of the database 102, the server machine 104, or the client computing device 122.

The database 102 is configured to store data that may be accessible to the server machine 104. For example, the database 102 may store information about multiple points of interest (POIs), multiple point of interest assessments, or multiple user accounts. The database 102 may be configured to provide data that the server machine 104 needs for processing to the server machine 104.

The server machine 104 is configured to execute instructions that may, among other things, determine relative interest levels of tourists and locals in points of interest or add, modify or delete data from the database 102. The server machine 104 may also provide an interface for a user of the client computing device 122 to access the data in the database 102 via the network.

As shown, the server machine 104 includes a processor 106, a network interface 108, and a memory 110. The processor 106 is configured to execute computer instructions that are stored in a computer-readable medium, such as the memory 110. For example, the processor 106 may be a central processing unit (CPU). The network interface 108 is configured to allow the server machine 104 to transmit and receive data in the network. The network interface 108 may include one or more network interface cards (NICs). The memory 110 stores data and instructions. As illustrated, the memory 110 stores a point of interest (POI) data structure 112 and a compute touristiness value module 120.

The point of interest (POI) data structure 112 may store information about a point of interest. Example points of interest may include businesses, landmarks, parks, or government buildings. As shown, the POI data structure 112 includes a set of assessment data structures 114.1-n, an indication of a geographic location 116, and a touristiness value 118.

The set of assessment data structures 114.1-n may include one or more assessments of the point of interest corresponding to POI data structure 112. Each individual assessment data structure (e.g., assessment data structure 114.1) may be a web-based assessment or an in-person assessment. A web-based assessment may be conducted by an user via the Internet without visiting the geographic location corresponding to the POI. For example, the user may visit a web page associated with the POI or access or provide information (e.g., a review, a comment within a social networking service, etc.) related to the POI. An in-person assessment of a POI may involve an user visiting the geographic location associated with the POI. For example, an in-person assessment of a POI may involve a geographic check-in at the POI via a social networking service, a connection to a WiFi network at the POI, or a global positioning system (GPS) signal received at the POI. Users of electronic devices (e.g., client computing device 122) may opt-out of having their geographic check-ins or the WiFi networks to which they connect recorded or provided to the server machine 104 or database 102. The data structure for an individual assessment (e.g. assessment data structure 114.1) is described in greater detail in conjunction with FIG. 2 below.

The POI data structure 112 may also include an indication of the geographic location 116 of the POI. The indication of the geographic location 116 may identify the geographic location of the POI. Example indications of geographic location 116 include a street address or a latitude and longitude. However, any known indication of geographic location 116 may be used in conjunction with the subject technology.

The POI data structure 112 may also include a touristiness value 118. The touristiness value 118 may be a value indicating how "touristy" the POI is, i.e., how interested are tourists in the POI relative to locals. In one implementation, the touristiness value may be expressed as a Boolean value with TRUE indicating that the POI is a largely tourist location and FALSE indicating that the POI is a largely local location, or vice versa. In another implementation, the touristiness value may be represented as an integer, as a real number, as a proportion, or as a percentage. Greater values may indicate more interest by tourists, relative to interest by locals, in the POI, or vice versa. The touristiness value 118 may be computed via the compute touristiness value module 120 and stored within the server machine 104 (as illustrated) or within the database 102. In one implementation, the touristiness value 118 may be updated occasionally as additional assessment data structures 114.1-n associated with the POI data structure 112 are stored on the server machine 104.

As illustrated, the memory 110 of the server machine 104 also includes a compute touristiness value module 120. The compute touristiness value module 120 may be configured to compute touristiness values for POIs, e.g., to compute the touristiness value 118 for the POI 112. In one implementation, the compute touristiness value module 120 may be configured to receive a set of assessments 114.1-n for the POI. The set of assessments 114.1-n may include web-based assessments or in-person assessments. Each assessment 114.1-n in the set of assessments may include an associated user account.

The compute touristiness value module 120 may also be configured, for plural assessments in the set of assessments 114.1-n, to determine whether the associated user account is a tourist user account or a local user account. The determination whether the associated user account is a tourist user account or a local user account may be based on a distance between a default location (e.g., a home address) for the user account the location of the POI. For example, if the POI is more than 100 miles away from the home address of the user account, the user account may be a tourist user account. If the POI is less than 50 miles away from the home address of the user account, the user account may be a local user account. Alternatively, the compute touristiness value module may determine whether the associated user account is a tourist user account or a local user account based on a number of web-based assessments or in-person assessments of the point of interest by the associated user account. POIs that are assessed rarely by the user account are likely to be tourist POIs as, for example, a resident of New York City may visit or assess the tourist attractions of New York City (e.g., the Statue of Liberty) rarely (e.g., once or twice per year when the resident is showing the city to his/her guests from other locations) and may visit the tourist attractions of other locations when he/she is travelling in the other locations. However, the resident of New York City may visit or assess local POIs often. For example, the resident may visit his/her favorite coffee shop every morning or order pizza via the website of his/her favorite pizzeria several times per month.

After determining, for plural assessments 114.1-n of the POI 112, whether the assessments are from tourist or local users, the compute touristiness value module 120 may be configured to determine a touristiness value 118 for the POI 112. The computation may be based on a proportion or percentage of assessments of the POI 112 by tourist user accounts or based on a ratio of tourist assessments to local assessments. The compute touristiness value module 120 may provide an indication of the touristiness value 118 as the output. The indication may include the touristiness value 118 itself or simply an indication whether the POI 112 is a tourist POI or a local POI.

The client computing device 122 may be any computing device capable of interacting with the database 102 or the server machine 104. For example, the client computing device may be able to provide a web-based assessment (e.g., a view of a web page associated with a POI or a posting of a review of the POI) or an in-person assessment (e.g., a geographic check-in at the POI) of the POI. The client computing device 122 may be a laptop computer, a desktop computer, a mobile phone, a personal digital assistant (PDA), a tablet computer, a netbook, a physical machine, or a virtual machine. other devices could also implement the functionalities of the client computing device 122. The client computing device 122 may include one or more of a keyboard, a mouse, a touch screen, and a display to allow the user to interact with the database 102 or the server machine 104. Furthermore, while only one client computing device 122 is illustrated here, persons skilled in the art will recognize that the techniques disclosed herein may be implemented with multiple client computing devices 122.

Figure 2:
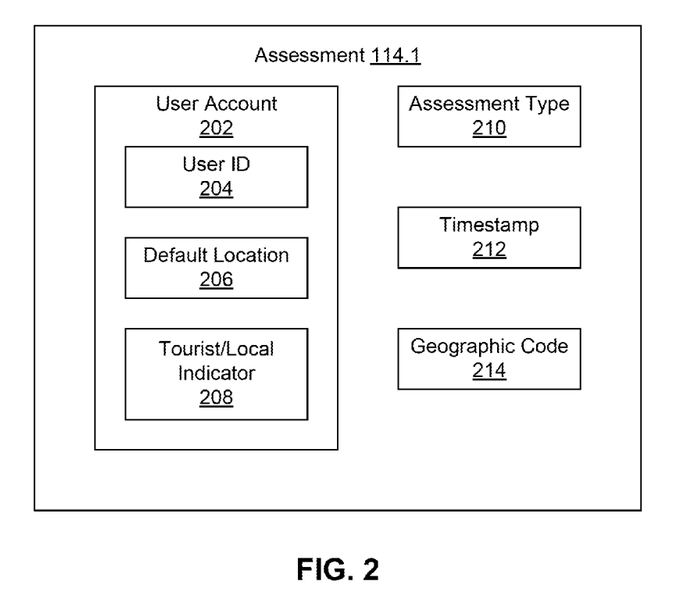
FIG. 2 illustrates an example of the assessment data structure of FIG. 1 in more detail.

FIG. 2 illustrates an example of an individual assessment data structure 114.1 of FIG. 1 in more detail.

As shown, the assessment data structure 114.1 includes a user account data structure 202, an assessment type 210, a timestamp 212, and a geographic code 214.

The user account data structure 202 stores information related to a user, e.g., a user of a client computing device (e.g., client computing device 122) from which the assessment 114.1 may have been received. The user account 202 may be an account in a social networking service, an account in a geographic check-in service, an account in a point of interest reviewing service, or any similar account. As shown, the user account data structure 202 includes a user identifier (ID) 204, a default location 206, and a tourist/local indicator 208.

The user ID 204 may be any identifier associated with the user account 202, for example, the user ID 204 may be a user name or an account number.

The default location 206 stores a default location associated with the user account 202. For example, the default location 206 may be a home address, a business address, or a mailing address associated with the user account 202, which may have been provided to the server machine 104 by the user when the user created or updated the user account. The default location 206 may include a complete street address or only a city and state or country or postal/zip code associated with the user account 202. Alternatively, the default location 206 may be determined based on a plurality of in-person assessments associated with the user account. For example, if a user frequently enters geographic check-ins at businesses in San Francisco, Calif., the user is likely a local of San Francisco. In one implementation, the assessment 114.1 may be a web-based assessment (e.g., a view of a webpage associated with a POI), and the default location may be determined based on the location of the client computing device 122 at the time the web-based assessment is entered. For example, if a user views a webpage associated with the Empire State Building from a computer in Chicago, the user is likely to live or work in Chicago and, therefore, to be a local of Chicago.

The user account data structure 202 may also store a tourist/local indicator 208. The tourist/local indicator may store whether the user associated with the user account 202 is a tourist or a local with respect to the POI 112 associated with the assessment 114.1 or whether the user's tourist/local status is uncertain. In one implementation, if the distance between the geographic location 116 of the POI 112 and the default location 206 of the user account 202 exceeds 100 miles, the tourist/local indicator 208 indicates that the user is a tourist. If the distance between the geographic location 116 of the POI 112 and the default location 206 of the user account 202 is less than 50 miles, the tourist/local indicator 208 indicates that the user is a local. If the distance between the geographic location 116 of the POI 112 and the default location 206 of the user account 202 is between 50 and 100 miles, the tourist/local indicator 208 indicates that the user's tourist/local status is uncertain. Alternatively, if the user has entered more than a first threshold number (e.g., five) assessments of the POI 112 within the last year, then the tourist/local indicator 208 may indicate that the user is a local. If the user has entered less than a second threshold number (e.g., two) assessments of the POI 112 within the last year, then the tourist/local indicator 208 may indicate that the user is a tourist. If the user has entered between the first threshold and the second threshold (i.e., between two and five) assessments of the POI 112 within the last year, then the tourist/local indicator 208 may indicate that the user's tourist/local status is uncertain.

The assessment data structure 114.1 may also store an assessment type 210. The assessment type 210 may indicate whether the assessment 114.1 is a web-based assessment or an in-person assessment. A web-based assessment may be conducted by an user via the Internet without visiting the geographic location corresponding to the POI. For example, the user may visit a web page associated with the POI or access or provide information (e.g., a review, a comment within a social networking service, etc.) related to the POI. An in-person assessment of a POI may involve an user visiting the geographic location associated with the POI. For example, an in-person assessment of a POI may involve a geographic check-in at the POI via a social networking service, a connection to a WiFi network at the POI, or a global positioning system (GPS) signal received at the POI. Users of electronic devices (e.g., client computing device 122) may opt-out of having their geographic check-ins or the WiFi networks to which they connect recorded or provided to the server machine 104 or database 102.

As illustrated, the assessment data structure 114.1 also includes a timestamp 212. The timestamp 212 may indicate the date and time when the assessment was entered or received by the server machine 104 or the database 102. An example time stamp may be "Jan. 1, 2011, at 11:00:00 PM Eastern Standard Time." The timestamp 212 may be used in determining a likely default location 206 of the user account 202 associated with the assessment data structure 114.1. For example, if a user account 202 includes multiple geographic check-ins in New York City before May 2010, and multiple geographic check-ins in San Francisco after May 2010, then the user may have relocated from New York City to San Francisco, and become a local of San Francisco, rather than New York City, around May 2010.

As shown, the assessment data structure 114.1 also includes a geographic code 214. The geographic code 214 may indicate a location of the client computing device (e.g., client computing device 122) which entered the assessment 114.1 at the time the assessment 114.1 was entered. The geographic code may be determined, for example, based on a global positioning system (GPS) unit within the client computing device 122 or based on one or more WiFi networks accessible to the client computing device 122. If the assessment 114.1 is a web-based assessment, the distance between the geographic location associated with the geographic code 214 and the geographic location 116 of the POI 112 may be used to determine whether the user is local to the POI 112 at the time of the web-based assessment. If the assessment 114.1 is an in-person assessment, the distance between the geographic location associated with the geographic code 214 and the geographic location 116 of the POI 112 may be used to verify that the user is really located at the POI 112. For example, if the user is greater than a threshold distance (e.g., one mile) from the POI 112 at the time when the user entered a geographic check-in at the POI 112, an error may have occurred with the geographic check-in.

Figure 3A:
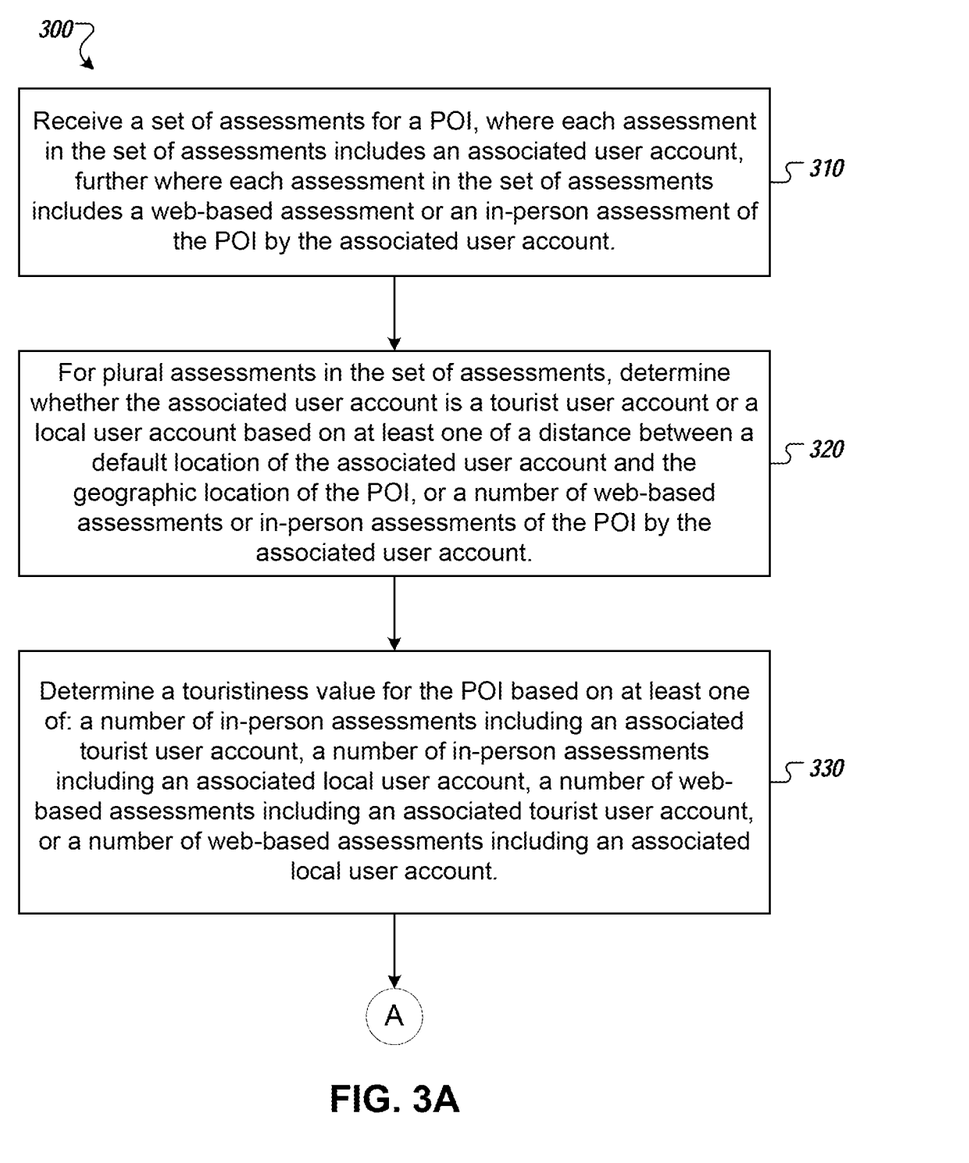
FIGS. 3A-3B illustrate an example process by which relative interest levels of tourists and locals in points of interest may be determined.
Figure 3B:
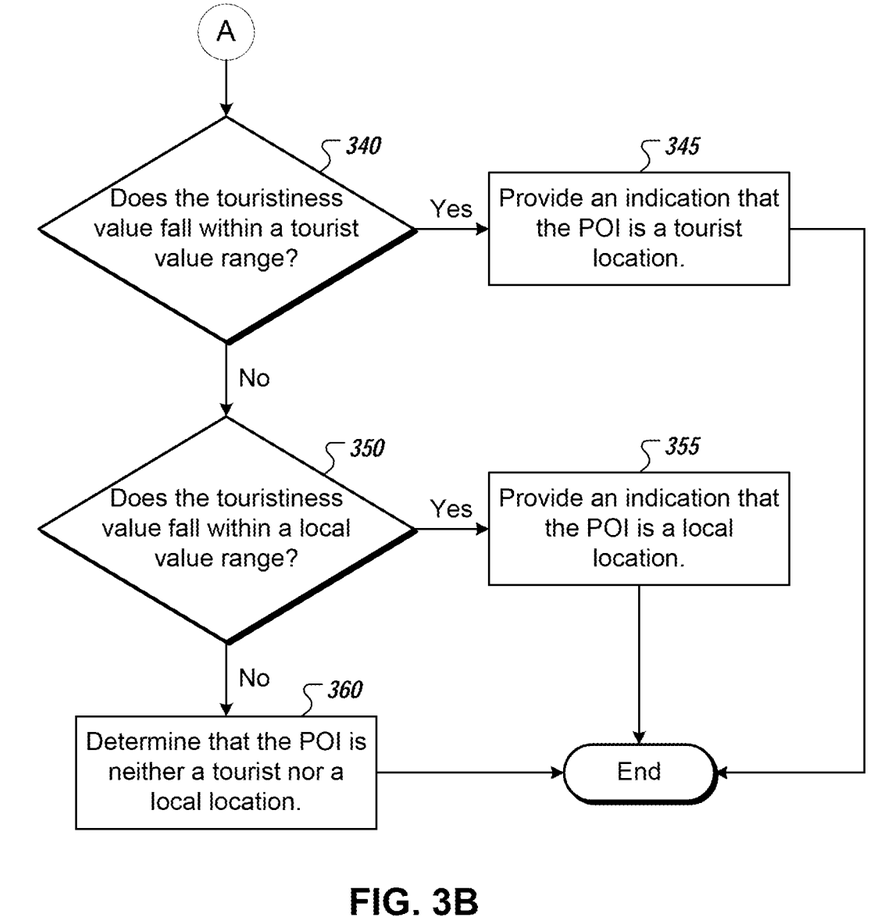

FIGS. 3A-3B illustrate an example process 300 by which relative interest levels of tourists and locals in points of interest may be determined.

The process 300 begins at step 310, where the server machine (e.g., server machine 104) receives a set of assessments for a point of interest (POI). Each assessment in the set of assessments includes an associated user account, e.g., of a user who entered the assessment. Each assessment in the set of assessments also includes a web-based assessment or an in-person assessment of the POI by the associated user account. A web-based assessment may be conducted by an user via the Internet without visiting the geographic location corresponding to the POI. For example, the user may visit a web page associated with the POI or access or provide information (e.g., a review, a comment within a social networking service, etc.) related to the POI. An in-person assessment of a POI may involve an user visiting the geographic location associated with the POI. For example, an in-person assessment of a POI may involve a geographic check-in at the POI via a social networking service, a connection to a WiFi network at the POI, or a global positioning system (GPS) signal received at the POI. Users of electronic devices (e.g., client computing device 122) may opt-out of having their geographic check-ins or the WiFi networks to which they connect recorded or provided to the server machine 104 or database 102. The set of assessments may include a combination of in-person assessments and web-based assessments, only in-person assessments, or only web-based assessments.

In step 320, the server machine, for plural assessments in the set of assessments, determines whether the associated user account is a tourist user account or a local user account based on at least one of a distance between a default location of the associated user account and the geographic location of the POI, or a number of web-based assessments or in-person assessments of the POI by the associated user account. The plural assessments in the set of assessments may include all the assessments in the set of assessments or a portion of the assessments in the set of assessments.

In one example, the server machine may determine whether the associated user account is a tourist user account or a local user account by calculating a distance between the geographic location of the POI and the default location of the user account. If the distance between the geographic location of the POI and the default location of the user account exceeds a tourist distance threshold (e.g. 100 miles), the server machine may conclude that the associated user account is a tourist account. If the distance between the geographic location of the POI and the default location of the user account is less than a local distance threshold (e.g. 50 miles), the server machine may conclude that the associated user account is a local account. If the distance between the geographic location of the POI and the default location of the user account is between the local distance threshold and the tourist distance threshold (i.e., between 50 and 100 miles), the server machine may remain uncertain regarding whether the associated user account is a tourist user account or a local user account.

The default location of an associated user account may be a home address, a business address, or a mailing address of the user account. The home, business, or mailing address may be entered by the user of the associated user account, for example, during account creation or account update The home, business, or mailing address may include a full street address or only a city/state/country or a postal/zip code. Alternatively, the default location of the user account may be determined based on a geographic location of a plurality of in-person assessments associated with the user account. For example, if a user account includes multiple geographic check-ins in San Francisco, Calif. during the last year, the user of the user account is likely to live or work in San Francisco. In another alternative, if the assessment is a web-based assessment, the default location of the user account may be determined based on the geographic location of the client computing device during the web-based assessment. For example, if a user views a webpage associated with the Sears Tower in Chicago from a computer in Los Angeles, the user is likely a local of Los Angeles.

In another implementation, the server machine may determine whether the associated user account is a tourist user account or a local user account based on the number of assessments of the POI by the associated user account. For example, the server machine may determine that the associated user account is a tourist user account if the number of web-based assessments or in-person assessments of the POI by the associated user account is less than a tourist visitor threshold (e.g., two assessments) in a certain time period (e.g., one year). The server machine may determine that the associated user account is a local user account if the number of web-based assessments or in-person assessments of the POI by the associated user is greater than a local visitor threshold (e.g., five assessments) in a certain time period (e.g., one year). If the number of web-based assessments or in-person assessments of the POI by the associated user is between the tourist visitor threshold and the local visitor threshold (i.e., between two and five), the server machine may remain uncertain regarding whether the associated user account is a local user account or a tourist user account with respect to the POI. In one implementation, the value of the tourist visitor threshold or the local visitor threshold may be determined via machine learning based on known tourist or local POIs. For example, in New York City, the Statue of Liberty may be a well-known tourist POI, which should have a touristiness value indicating great interest by tourists and less interest by locals, while certain restaurants in the Upper East Side and Upper West Side may be local POIs, which should have a touristiness value indicating great interest by locals and less interest by tourists.

In step 330, the server machine determines a touristiness value for the POI based on at least one of: a number of in-person assessments including an associated tourist user account, a number of in-person assessments including an associated local user account, a number of web-based assessments including an associated tourist user account, or a number of web-based assessments including an associated local user account. The server machine may provide an indication of the touristiness value, for example, to the client computing device or to a companion application that provides information about the touristiness of points of interest. For example, a mapping companion application may provide reviews of points of interest and information about the touristiness of points of interest. Alternatively, a social networking companion application may list geographic locations where the social contacts of a user entered geographic check-ins, as well as the touristiness of the geographic locations. The companion application may run on the server machine (e.g., server machine 104), on the client computing device (e.g., client computing device 122), or on another machine. The touristiness value may be represented as a Boolean value (e.g., TRUE if the POI is largely a tourist location, FALSE otherwise, or vice versa), an integer value, or a real number value.

In one implementation, the server machine may determine the touristiness value of a POI by calculating a proportion of the assessments of the POI in the set of assessments that include an associated tourist user account. In another implementation, the server machine may determine the touristiness value by calculating a proportion of the in-person assessments of the POI in the set of assessments that include an associated tourist user account. In-person assessments may be more reliable indicators of touristiness than web-based assessments because in-person assessments require the user to visit the POI rather than research the POI from a computer remote to the POI.

In yet another implementation, the server machine may determine the touristiness value of a POI by calculating a ratio of a weighted sum of the number of in-person assessments including an associated tourist user account and the number of web-based assessments including an associated tourist user account to a weighted sum of the number of in-person assessments including an associated local user account and the number of web-based assessments including an associated local user account, or by calculating the inverse of this ratio. In one additional implementation, the server machine may determine the touristiness value of a POI by calculating a ratio of the number of in-person assessments including an associated tourist user account to the number of in-person assessments including an associated local user account, or by calculating the inverse of this ratio.

In step 340, the server machine determines whether the touristiness value for the POI falls within a tourist value range. In one implementation, the touristiness value is a Boolean value, and the value TRUE corresponds to the tourist value range, while the value FALSE corresponds to a local value range, or vice versa. Alternatively, the touristiness value may be an integer or a real number. The touristiness value falling within the tourist value range may correspond to the POI being largely a tourist location.

The tourist value range or the local value range for the touristiness value may be determined by machine learning based on known tourist or local POIs. For example, in New York City the Statue of Liberty may be a well-known tourist POI, which should have a touristiness value indicating great interest by tourists and less interest by locals, while certain restaurants in the Upper East Side and Upper West Side may be local POIs, which should have a touristiness value indicating great interest by locals and less interest by tourists. If the touristiness value falls within the tourist value range, the process 300 continues to step 345. If the touristiness value does not fall within the tourist value range, the process 300 continues to step 350.

In step 345, if the touristiness value of the POI falls within the tourist value range, the server machine provides an indication that the POI is a tourist location. The indication may be provide, for example, to a mapping service that provides information about points of interest or to a social networking service that provides information about points of interest visited by the social contacts of a user. The information about a specific POI may include, for example, among other things, whether the POI is a tourist or local location, the hours when the POI may be accessed, reviews of the POI, or advertisements for products or services related to the POI. After step 345, the process 300 ends.

In step 350, if the touristiness value of the POI does not fall within the tourist value range, the server machine determines whether the touristiness value for the POI falls within the local value range. In one implementation, the tourist value range and the local value range may be mutually exclusive and collectively exhaustive, i.e., any touristiness value may correspond either to the tourist value range or the local value range, but not both and not neither. In another implementation, certain touristiness values may correspond to neither tourist nor local locations. For example, the touristiness value may be an integer between 0 and 100, where the integers 0-30 correspond to local locations, the integers 70-100 correspond to tourist locations, and the integers 31-69 correspond to neither tourist nor local locations. If the touristiness value falls within the local value range, the process 300 continues to step 355. If the touristiness value does not fall within the local value range, the process 300 continues to step 360.

In step 355, if the touristiness value of the POI falls within the local value range, the server machine provides an indication that the POI is a local location. The indication may be provide, for example, to a mapping service that provides information about points of interest or to a social networking service that provides information about points of interest visited by the social contacts of a user. The information about a specific POI may include, for example, among other things, whether the POI is a tourist or local location, the hours when the POI may be accessed, reviews of the POI, or advertisements for products or services related to the POI. After step 355, the process 300 ends.

In step 360, if the touristiness value of the POI does not fall within the local value range, the server machine determines that the POI is neither a tourist nor a local location. The server machine may provide an indication that the POI is neither a tourist nor a local location. After step 360, the process 300 ends.

Aspects of the subject technology involve determining geographic location(s) of user(s) or mobile device(s) and transmitting the determined geographic location(s) to a server or determining and storing default geographic location(s) of user(s) or mobile device(s). The determinations of geographic location are known to the user and described in contextual notices provide to the user in plain language, for example, when the user downloads or executes an application. Furthermore, persistent reminders are provided in the user interface of the mobile device that the geographic location is being determined and transmitted. In some aspects, periodic reminders are provided to the user when the user logs into an application (e.g., every tenth login or every thirty days) or electronic messages (e.g., email) are provided to the user to remind him/her of the determinations of the geographic location. The user explicitly and affirmatively provides consent to having the geographic location of his/her mobile device determined and may easily withdraw or revoke such consent at any time via the user interface of the mobile device. Furthermore, the user may remove any geographic location information associated with the mobile device of the user stored by the service (e.g., in a data repository or a server). In some aspects, a privacy dashboard may be provided via the mobile device that allows the user to determine which information about his/her current or past geographic location(s) is stored by the service or by the mobile device or to remove such information from the service or from the mobile device. Furthermore, all geographic location information is encrypted when transmitted over a network to prevent unauthorized access to the geographic location information.

In addition, any user data stored at the server or stored at a mobile device is not used to determine touristiness of a geographic location unless the user has provided permission beforehand for the use of his/her information to determine information about geographic location(s). The user may withdraw his/her permission at any time and may be reminded that he/she has provided permission and may withdraw his/her permission for example, using the techniques described above. In some cases, the user may provide permission for his/her user data to be used for multiple purposes (e.g., touristiness, business hours, correlation(s)

between geographic locations visited, traffic information, travel speed information, etc.) simultaneously.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Figure 4:
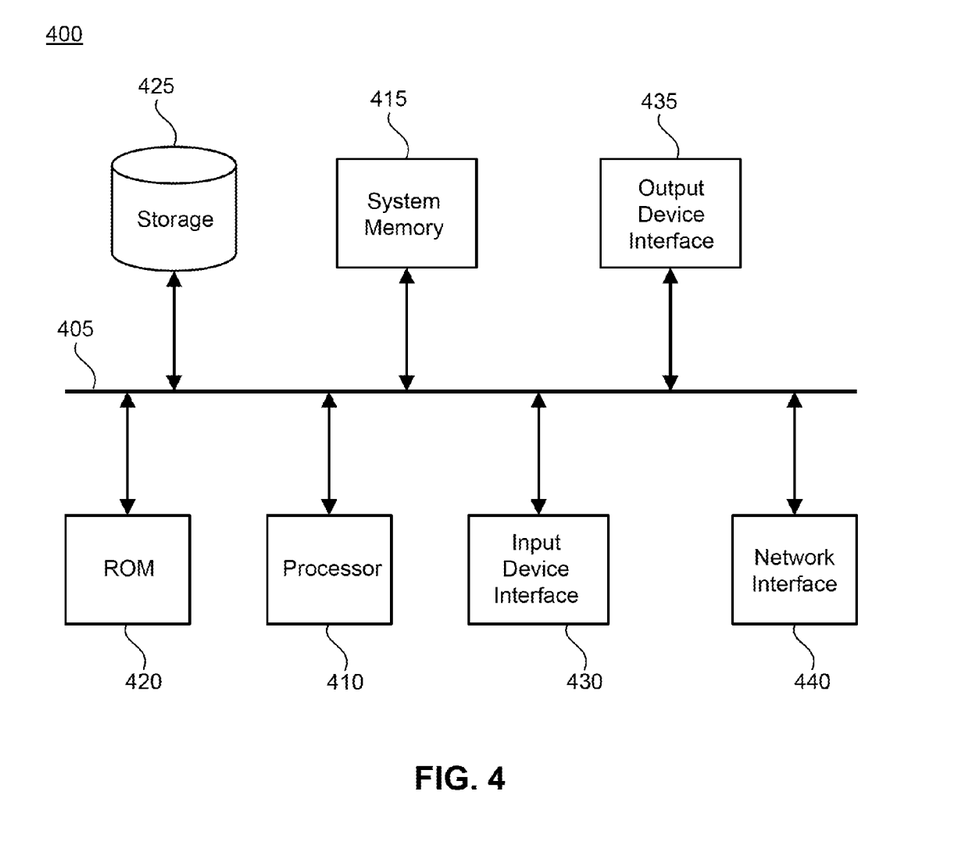
FIG. 4 conceptually illustrates an electronic system with which some implementations of the subject technology are implemented.

FIG. 4 conceptually illustrates an electronic system 400 with which some implementations of the subject technology are implemented. For example, one or more of the database 102, the server machine 104, or the client computing device 122 may be implemented using the arrangement of the electronic system 400. The electronic system 400 can be a computer (e.g., a mobile phone, PDA), or any other sort of electronic device. Such an electronic system includes various types of computer readable media and interfaces for various other types of computer readable media. Electronic system 400 includes a bus 405, processing unit(s) 410, a system memory 415, a read-only memory 420, a permanent storage device 425, an input device interface 430, an output device interface 435, and a network interface 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425.

From these various memory units, the processing unit(s) 410 retrieves instructions to execute and data to process in order to execute the processes of the subject technology. The processing unit(s) can be a single processor or a multi-core processor in different implementations.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off. Some implementations of the subject technology use a mass-storage device (for example a magnetic or optical disk and its corresponding disk drive) as the permanent storage device 425.

Other implementations use a removable storage device (for example a floppy disk, flash drive, and its corresponding disk drive) as the permanent storage device 425. Like the permanent storage device 425, the system memory 415 is a read-and-write memory device. However, unlike storage device 425, the system memory 415 is a volatile read-and-write memory, such a random access memory. The system memory 415 stores some of the instructions and data that the processor needs at runtime. In some implementations, the processes of the subject technology are stored in the system memory 415, the permanent storage device 425, or the read-only memory 420. For example, the various memory units include instructions for determining relative interest levels of tourists and locals in points of interest in accordance with some implementations. From these various memory units, the processing unit(s) 410 retrieves instructions to execute and data to process in order to execute the processes of some implementations.

The bus 405 also connects to the input and output device interfaces 430 and 435. The input device interface 430 enables the user to communicate information and select commands to the electronic system. Input devices used with input device interface 430 include, for example, alphanumeric keyboards and pointing devices (also called "cursor control devices"). Output device interfaces 435 enables, for example, the display of images generated by the electronic system 400. Output devices used with output device interface 435 include, for example, printers and display devices, for example cathode ray tubes (CRT) or liquid crystal displays (LCD). Some implementations include devices for example a touchscreen that functions as both input and output devices.

Finally, as shown in FIG. 4, bus 405 also couples electronic system 400 to a network (not shown) through a network interface 440. In this manner, the electronic system 400 can be a part of a network of computers (for example a local area network ("LAN"), a wide area network ("WAN"), or an Intranet, or a network of networks, for example the Internet. Any or all components of electronic system 400 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A computer-implemented method for determining whether a point of interest corresponds to a tourist location, the method comprising:
    receiving a set of geographic check-ins at the point of interest, wherein each geographic check-in in the set of geographic check-ins comprises an associated user account, wherein each geographic check-in is established based on at least one of a social networking service, a WiFi network connection, or a positioning system signal;
    for plural geographic check-ins in the set of geographic check-ins and a code that indicates a geographic location of the point of interest, determining whether the associated user account is a tourist user account or a local user account based on at least one of a distance between a default location of the associated user account and the geographic location of the point of interest indicated by the code;
    generating a local or tourist point of interest based at least in part on a touristiness value for the point of interest, wherein the touristiness value for the point of interest is represented as a data structure that comprises at least one of a Boolean value, an integer, a real number, a proportion, or a percentage value, and wherein the touristiness value for the point of interest is determined based at least in part on a calculation of a ratio of a number of geographic check-ins from among the plural geographic check-ins comprising the respective associated tourist user accounts to a number of geographic check-ins from among the plural geographic check-ins comprising the respective associated local user accounts; and
    outputting an indication of the local or tourist point of interest for at least one of a graphical user interface associated with a client computing device or a companion application.

2. The method of claim 1, wherein determining the touristiness value for the point of interest comprises:
    calculating a proportion of the geographic check-ins in the set of geographic check-ins that comprise the respective associated tourist user accounts.

3. The method of claim 1, wherein determining whether the associated user account is the tourist user account or the local user account based on the distance between the default location of the associated user account and the geographic location of the point of interest comprises:
    determining that the associated user account is the tourist user account based on the distance between the default location of the associated user account and the geographic location of the point of interest exceeding a tourist distance threshold; or
    determining that the associated user account is the local user account based on the distance between the default location of the associated user account and the geographic location of the point of interest failing to exceed a local distance threshold.

4. The method of claim 1, wherein the default location of the associated user account comprises a home address, a business address, or a mailing address of the associated user account.

5. The method of claim 1, further comprising determining the default location of the associated user account based on a plurality of geographic check-ins of the associated user account.

6. The method of claim 1, wherein determining whether the associated user account is the tourist user account or the local user account is based on a number of geographic check-ins from among the plural geographic check-ins at the point of interest by the associated user account, the method comprising:
    determining that the associated user account is the tourist user account if the number of geographic check-ins from among the plural geographic check-ins at the point of interest by the associated user account is less than a tourist visitor threshold, or
    determining that the associated user account is a local user account if the number of geographic check-ins from among the plural geographic check-ins at the point of interest by the associated user account is greater than a local visitor threshold.

7. The method of claim 1, further comprising:
    determining that the point of interest is a tourist location based on the touristiness value falling within a tourist value range, or
    determining that the point of interest is a local location based on the touristiness value falling within a local value range.

8. A non-transitory computer-readable medium for determining whether a point of interest corresponds to a tourist location, the computer-readable medium comprising instructions that, when executed by one or more computers, cause the one or more computers to implement a method, the method comprising:
    receiving a set of geographic check-ins at the point of interest, wherein each geographic check-in in the set of geographic check-ins comprises an associated user account wherein each geographic check-in is established based on at least one of a social networking service, a WiFi network connection, or a positioning system signal;
    for plural geographic check-ins in the set of geographic check-ins and a code that indicates a geographic location of the point of interest, determining whether the associated user account is a tourist user account or a local user account based on at least one of a distance between a default location of the associated user account and the geographic location of the point of interest indicated by the code;
    generating a local or tourist point of interest based at least in part on a touristiness value for the point of interest, wherein the touristiness value for the point of interest is represented as a data structure that comprises at least one of a Boolean value, an integer, a real number, a proportion, or a percentage value, and wherein the touristiness value for the point of interest is determined based at least in part on a calculation of a ratio of a number of geographic check-ins from among the plural geographic check-ins comprising the respective associated tourist user accounts to a number of geographic check-ins from among the plural geographic check-ins comprising the respective associated local user accounts;

if the touristiness value falls within a tourist value range, providing an indication that the point of interest is a tourist location, wherein providing the indication that the point of interest is the tourist location comprises outputting the indication for at least one of a graphical user interface associated with a client computing device or a companion application; and if the touristiness value falls within a local value range, providing an indication that the point of interest is a local location, wherein providing the indication that the point of interest is the local location comprises outputting the indication for at least one of the graphical user interface associated with the client computing device or the companion application.

9. The non-transitory computer-readable medium of claim 8, wherein determining the touristiness value for the point of interest comprises:

calculating a proportion of the geographic check-ins in the set of geographic check-ins that comprise the respective associated tourist user accounts.

10. The non-transitory computer-readable medium of claim 8, wherein the default location of the associated user account comprises a home address, a business address, or a mailing address of the associated user account.

11. The non-transitory computer-readable medium of claim 8, the method further comprising determining the default location of the associated user account based on a plurality of geographic check-ins of the associated user account.

12. The non-transitory computer-readable medium of claim 8, wherein determining whether the associated user account is the tourist user account or the local user account is based on a number of geographic check-ins from among the plural geographic check-ins at the point of interest by the associated user account, the method comprising:

determining that the associated user account is the tourist user account if the number of geographic check-ins from among the plural geographic check-ins at the point of interest by the associated user account is less than a tourist visitor threshold, or determining that the associated user account is the local user account if the number of geographic check-ins from among the plural geographic check-ins at the point of interest by the associated user account is greater than a local visitor threshold.

13. The non-transitory computer-readable medium of claim 8, the method further comprising:

determining that the point of interest is a tourist location based on the touristiness value falling within a tourist value range, or determining that the point of interest is a local location based on the touristiness value falling within a local value range.

14. A system for determining whether a point of interest corresponds to a tourist location, the system comprising:

one or more processors; and a memory comprising instructions that, when executed by the one or more processors, cause the one or more processors to implement a method, the method comprising:

receiving a set of geographic check-ins at the point of interest, wherein each geographic check-in in the set of geographic check-ins comprises an associated user account and a code that indicates a geographic location of the point of interest, wherein each geographic check-in is established based on at least one of a social networking service, a WiFi network connection, or a positioning system signal, for plural geographic check-ins in the set of geographic check-ins, determining whether the associated user account is a tourist user account or a local user account based on at least one of a distance between a default location of the associated user account and the geographic location of the point of interest indicated by the code, generating a local or tourist point of interest based at least in part on a touristiness value for the point of interest, wherein the touristiness value for the point of interest is represented as a data structure that comprises at least one of a Boolean value, an integer, a real number, a proportion, or a percentage value, and wherein the touristiness value for the point of interest is determined based at least in part on a calculation of a ratio of a number of geographic check-ins from among the plural geographic check-ins comprising the respective associated tourist user accounts to a number of geographic check-ins from among the plural geographic check-ins comprising the respective associated local user accounts, and outputting an indication of the local or tourist point of interest for at least one of a graphical user interface associated with a client computing device or a companion application.

15. The system of claim 14, the method further comprising:

calculating a proportion of the geographic check-ins in the set of geographic check-ins that comprise the respective associated tourist user accounts.

* * * * *